United States Patent
Brotherton-Ratcliffe

(10) Patent No.: US 7,852,887 B2
(45) Date of Patent: Dec. 14, 2010

(54) LASER

(75) Inventor: David Brotherton-Ratcliffe, Pease Pottage (GB)

(73) Assignee: View Holographics Ltd. (GB)

( * ) Notice: Subject to any disclaimer, the term of this patent is extended or adjusted under 35 U.S.C. 154(b) by 263 days.

(21) Appl. No.: 11/997,723

(22) PCT Filed: Jul. 28, 2006

(86) PCT No.: PCT/GB2006/002829

§ 371 (c)(1),
(2), (4) Date: Aug. 8, 2008

(87) PCT Pub. No.: WO2007/015073

PCT Pub. Date: Feb. 8, 2007

(65) Prior Publication Data

US 2009/0201957 A1    Aug. 13, 2009

(30) Foreign Application Priority Data

Aug. 2, 2005    (GB) ................. 0515883.3

(51) Int. Cl.
*H01S 3/13* (2006.01)
(52) U.S. Cl. ............... 372/29.02; 372/29.014
(58) Field of Classification Search ......... 372/12, 372/33, 36; 361/711
See application file for complete search history.

(56) References Cited

U.S. PATENT DOCUMENTS

| | | | |
|---|---|---|---|
| 3,793,595 A | 2/1974 | Russo et al. | |
| 4,156,209 A * | 5/1979 | Herbst et al. | 372/101 |
| 4,197,513 A * | 4/1980 | Bell et al. | 372/12 |
| 4,819,246 A | 4/1989 | Aiello et al. | |
| 4,823,348 A | 4/1989 | Hercher | |
| 4,918,704 A * | 4/1990 | Caprara et al. | 372/99 |
| 7,460,566 B2 * | 12/2008 | Kennedy | 372/10 |
| 2004/0050280 A1 | 3/2004 | Rodin et al. | |

FOREIGN PATENT DOCUMENTS

| | | |
|---|---|---|
| DE | 10339210 A1 | 8/2005 |
| JP | 57124487 | 8/1982 |
| JP | 58176989 | 10/1983 |

\* cited by examiner

*Primary Examiner*—Minsun Harvey
*Assistant Examiner*—Tuan N. Nguyen
(74) *Attorney, Agent, or Firm*—Cantor Colburn LLP

(57) ABSTRACT

A pulsed laser is disclosed comprising an active lasing medium (1), an output coupler (5) and a rear cavity mirror (6). The rear cavity mirror (6) is attached to a mount (21) via an intermediate attachment (15). Heating elements are embedded within the attachment (15). The attachment (15) is heated in order to vary the physical length of the laser cavity in a manner which seeks to stabilise the output energy and wavelength of the laser pulses emitted from the laser cavity.

14 Claims, 7 Drawing Sheets

LASER

The present invention relates to a laser. According to the preferred embodiment a pulsed laser for use in a commercial digital holographic printer is provided. The pulsed laser preferably comprises a flash lamp-pumped laser cavity which is preferably actively stabilised.

Certain applications such as digital holographic printing ideally require a relatively energetic flash lamp-pumped laser source. The laser source should have a relatively low repetition rate (10-100 Hz) and produce nanosecond pulses. It is desired that the laser source should have a very narrow line width spectral emission in the visible region and a super-Guassian or $TEM_{00}$ spatial profile. The laser should also output pulses which have a constant energy and the laser should exhibit good frequency stability.

A known laser system for digital holographic printing applications uses the technique of injection seeding to provide a laser source which is sufficiently stable for digital holographic printing purposes. The technique of injection seeding involves employing a special thermo-stabilized small cavity to provide a seeding signal for a larger master oscillator. The small cavity is monolithic and the laser output from the small cavity is $TEM_{00}$ (single longitudinal mode) and continuous wave (CW).

The continuous wave laser output from the small cavity forms a seeding signal for the separate main lamp-pumped master oscillator. In order for injection seeding to work, the cavity length of the master oscillator is controlled actively using a piezo-mounted rear mirror. The cavity length of the master oscillator is matched to the longitudinal mode of the seeding signal. The matching process is performed by minimizing the time for a laser pulse to appear after an electro-optic Q-switch in the master oscillator cavity is opened.

The known injection seeding system suffers from the problem that it is relatively complex and expensive. As will be appreciated by those skilled in the art, injection seeding systems require a relatively expensive seeding laser and a relatively expensive and complex electro-optical Q-switching system which is capable of nanosecond switching of multi-kV signals. Furthermore, known injection seeding systems also require a piezo feedback system and complex fast feedback and optimization electronics.

It is therefore desired to be able to stabilise a laser source which is suitable for use in a commercial digital holographic printer without having to stabilise the laser by the technique of injection seeding.

According to an aspect of the present invention there is provided a pulsed laser comprising:

a laser cavity, wherein the laser cavity comprises a cavity mirror and a component attached or connected to the cavity mirror;

heating means arranged to heat the component; and control means arranged and adapted to control the heating means in order to stabilise one or more parameters of the laser.

The component preferably comprises a tube, block or device attached or connected directly to the cavity mirror. Alternatively, the component may comprise a tube, block or device which is attached or connected indirectly to the cavity mirror. For example, an insulator, insulating layer or non-conductive element may be located between the component and the cavity mirror. The component is preferably made from a metal or an alloy, for example aluminium. The component preferably has an axial length selected from the group consisting of: (i) <0.2 cm; (ii) 0.2-0.4 cm; (iii) 0.4-0.6 cm; (iv) 0.6-0.8 cm; (v) 0.8-1.0 cm; (vi) 1.0-1.2 cm; (vii) 1.2-1.4 cm; (viii) 1.4-1.6 cm; (ix) 1.6-1.8 cm; (x) 1.8-2.0 cm; and (xi) >2.0 cm.

The laser preferably further comprises a mount for the cavity mirror. The component may be attached or connected directly to the mount. Alternatively, the component may be attached or connected indirectly to the mount. For example, an insulator, insulating layer or non-conductive element may be located between the component and the mount.

The heating means preferably comprises one or more heating elements arranged adjacent to or embedded within the component. The heating means is preferably arranged to cause thermal expansion of the component. According to the preferred embodiment the heating means is arranged to supply heat to the component thereby causing the component to expand thereby displacing or varying the longitudinal position of the cavity mirror within the laser cavity and causing the length of the laser cavity to vary. The heating means preferably causes a reduction in the length of the laser cavity.

According to an embodiment one or more temperature sensors may be arranged to monitor and/or sense and/or determine the temperature of the component and/or the cavity mirror.

The laser preferably further comprises a detector means for detecting or determining the output energy of the laser. The detector means preferably comprises a photodiode. A wedge or other optical component may be provided which is arranged to deflect a proportion of the laser output of the laser onto a detector. The wedge or other optical component is preferably arranged within or outside of the laser cavity.

According to the preferred embodiment the parameter to be stabilised preferably comprises the output energy of the laser. Additionally/alternatively, the parameter to be stabilised comprises the wavelength of radiation emitted or output by the laser.

The control means is preferably arranged to maximise the laser output energy or minimise the reciprocal of the laser output energy. Additionally/alternatively, the control means is preferably arranged to minimise the standard deviation of the laser output energy or maximise the reciprocal of the standard deviation of the laser output energy.

The laser preferably further comprises means for frequency converting laser pulses output from the laser cavity. The laser preferably further comprises means for frequency doubling or frequency trebling laser pulses output from the laser cavity. The means for frequency converting preferably comprises a KTP crystal.

The laser is preferably arranged to emit laser pulses having a pulse length selected from the group consisting of: (i) <1 ns; (ii) 1-5 ns; (iii) 5-10 ns; (iv) 10-15 ns; (v) 15-20 ns; (vi) 20-25 ns; (vii) 25-30 ns; (viii) 30-35 ns; (ix) 35-40 ns; (x) 40-45 ns; (xi) 45-50 ns; and (xii) >50 ns.

The laser is preferably arranged to emit laser pulses having a pulse energy selected from the group consisting of: (i) <1 mJ; (ii) 1-5 mJ; (iii) 5-10 mJ; (iv) 10-15 mJ; (v) 15-20 mJ; and (vi) >20 mJ.

The laser preferably comprises a Q-switch. According to the preferred embodiment the Q-switch comprises a passive Q-switch. The Q-switch may comprise a Cr:YAG, Cr:GSGG or LiF saturable absorber. Alternatively, the Q-switch may comprise an active Q-switch.

One or more Fabry-Perrot etalons are preferably located within the laser cavity. The laser may further comprise a telescope comprising two or more lenses located within the laser cavity.

The laser cavity preferably comprises a Nd:YAG crystal or rod as the active lasing medium. The laser cavity is preferably arranged to output laser radiation at 1064 nm, 1319 nm or 1338 nm.

According to the preferred embodiment the laser cavity comprises a linear laser cavity. However, according to a less preferred embodiment the laser cavity may comprise a ring laser cavity.

The laser is preferably arranged to operate in a $TEM_{00}$ or Single Longitudinal Mode of operation.

The laser preferably comprises one or more flash lamps for pumping an active laser medium within the laser cavity. According to a less preferred embodiment the laser may further comprise one or more diode lasers for pumping an active laser medium within the laser cavity.

According to a less preferred embodiment the laser preferably further comprises an intra-cavity wedge. The laser preferably further comprises intra-cavity wedge heating means arranged to heat the intra-cavity wedge. The control means is preferably arranged and adapted to control the intra-cavity wedge heating means in order to stabilise one or more parameters of the laser.

The laser preferably comprises an output coupler. According to a less preferred embodiment the laser preferably further comprises an output coupler heating means arranged to heat the output coupler. The control means is preferably arranged and adapted to control the output coupler heating means in order to stabilise one or more parameters of the laser.

According to another aspect of the present invention there is provided a device comprising at least one, two or three pulsed lasers as described above. At least one laser is preferably arranged to output laser radiation in the red visible spectrum having a wavelength in the range 630-760 nm. At least one laser is preferably arranged to output laser radiation in the green visible spectrum having a wavelength in the range 520-570 nm. At least one laser is preferably arranged to output laser radiation in the blue visible spectrum having a wavelength in the range 420-490 nm.

The device may comprise a holographic printer and/or a holographic copying device.

According to another aspect of the present invention there is provided a method of stabilising one or more parameters of a laser, the method comprising:
providing a pulsed laser comprising a laser cavity, wherein the laser cavity comprises a cavity mirror and a component attached or connected to the cavity mirror;
heating the component; and
controlling the heating of the component in order to stabilise one or more parameters of the laser.

According to another aspect of the present invention there is provided a laser comprising a laser cavity, the laser cavity comprising:
an output coupler;
an active laser medium;
a rear cavity mirror;
an attachment to the rear cavity mirror; and
control means arranged to increase and/or decrease the temperature of the attachment in order to stabilise the energy output and/or output wavelength of the laser.

According to another aspect of the present invention there is provided a method of stabilising a laser comprising:
providing a laser cavity comprising an output coupler, an active laser medium, a rear cavity mirror and an attachment to the rear cavity mirror; and
increasing and/or decreasing the temperature of the attachment in order to stabilise the energy output and/or output wavelength of the laser.

According to another aspect of the present invention there is provided a pulsed laser comprising:
a laser cavity, wherein the laser cavity comprises an output coupler;
heating means arranged to heat the output coupler; and
control means arranged and adapted to control the heating means in order to stabilise one or more parameters of the laser.

According to another aspect of the present invention there is provided a method of stabilising a laser comprising:
providing a pulsed laser comprising a laser cavity, wherein the laser cavity comprises an output coupler;
heating the output coupler; and
controlling the heating of the output coupler in order to stabilise one or more parameters of the laser.

According to another aspect of the present invention there is provided a laser comprising:
a laser cavity, wherein the laser cavity comprises an intra-cavity wedge;
heating means arranged to heat the intra-cavity wedge; and
control means arranged and adapted to control the heating means in order to stabilise one or more parameters of the laser.

According to another aspect of the present invention there is provided a method of stabilising one or more parameters of a laser comprising:
providing a laser cavity, wherein the laser cavity comprises an intra-cavity wedge;
heating the intra-cavity wedge; and
controlling the heating of the intra-cavity wedge in order to stabilise one or more parameters of the laser.

According to another aspect of the present invention there is provided a laser comprising:
a laser cavity, wherein the laser cavity comprises an optical component disposed within or adjacent the laser cavity;
means for heating and/or cooling the optical component; and
control means arranged to control the means for heating and/or cooling in order to stabilise one or more parameters of the laser.

According to another aspect of the present invention there is provided a method of stabilising one or more parameters of a laser comprising:
providing a laser cavity, wherein the laser cavity comprises an optical component disposed within or adjacent the laser cavity;
heating and/or cooling the optical component; and
controlling the heating and/or cooling of the optical component in order to stabilise one or more parameters of the laser.

According to another aspect of the present invention there is provided a pulsed laser comprising:
a laser cavity, wherein the laser cavity comprises a cavity mirror;
heating means arranged to heat the cavity mirror; and
control means arranged and adapted to control the heating means in order to stabilise one or more parameters of the laser.

According to another aspect of the present invention there is provided a method of stabilising one or more parameters of a laser comprising the steps of:
providing a laser cavity, wherein the laser cavity comprises a cavity mirror;
heating the cavity mirror; and
controlling the heating of the cavity mirror in order to stabilise one or more parameters of the laser.

The preferred embodiment relates to a component or attachment mounted between the rear mirror of a laser cavity and a mount associated with the rear mirror. The component or attachment preferably comprises an aluminium tube which is preferably heated in use. As the tube is heated it expands causing the rear mirror to move and so vary the optical length of the laser cavity.

According to other less preferred embodiments a heated output coupler or a heated intra-cavity glass wedge may be provided in addition to or instead of a heated attachment to the rear cavity mirror. The heated output coupler and heated intra-cavity glass wedge are preferably used to vary the optical length of the laser cavity in a similar manner to the heated attachment to the rear cavity mirror.

The temperature of the attachment to the rear cavity mirror, output coupler or intra-cavity glass wedge may preferably be controlled actively by reference to the laser emission energy and/or the standard deviation of the laser emission energy.

A laser according to the preferred embodiment enables a stabilised laser source to be provided which advantageously is less complex than known stabilised laser sources and which advantageously avoids the use of injection seeding. The laser source according to the preferred embodiment also exhibits superior performance and enhanced stability compared to other known laser sources including those which use injection seeding.

Various embodiments of the present invention will now be described, by way of example only, and with reference to the accompanying drawings in which.

Figure 5:
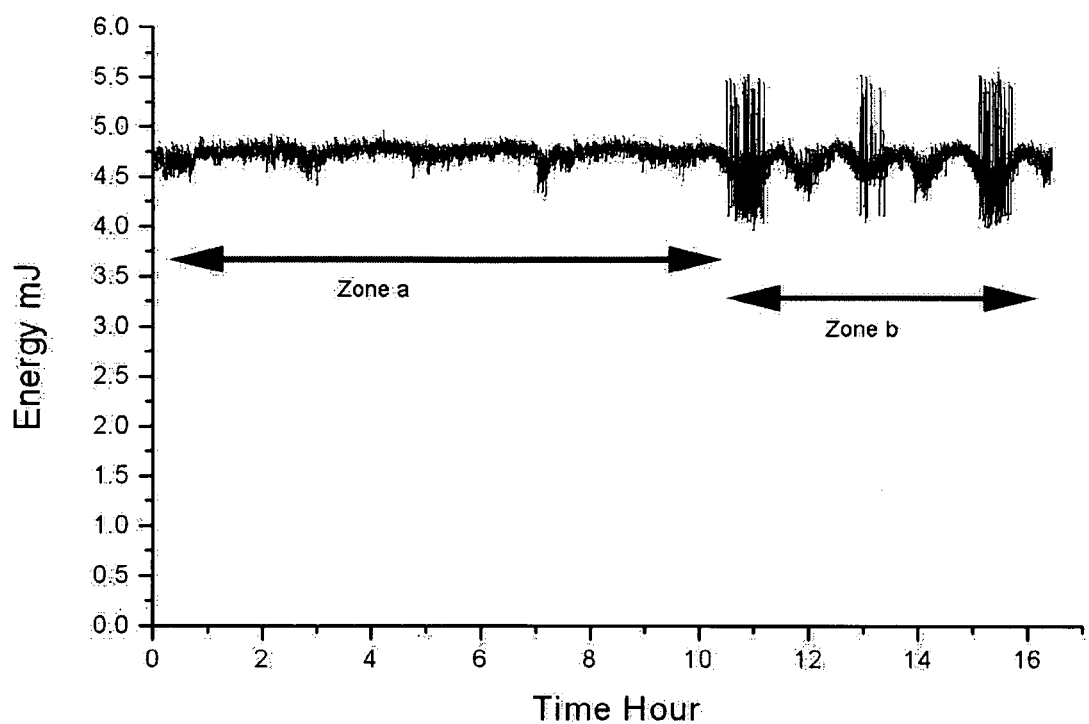
FIG. 5 shows how the output energy of a laser at the second harmonic (532 nm) varied as a function of time whilst the laser was actively stabilised according to the preferred embodiment of the present invention (zone a) and how the output energy of the laser then subsequently varied as a function of time when the laser was no longer actively stabilised (zone b)
Figure 6:
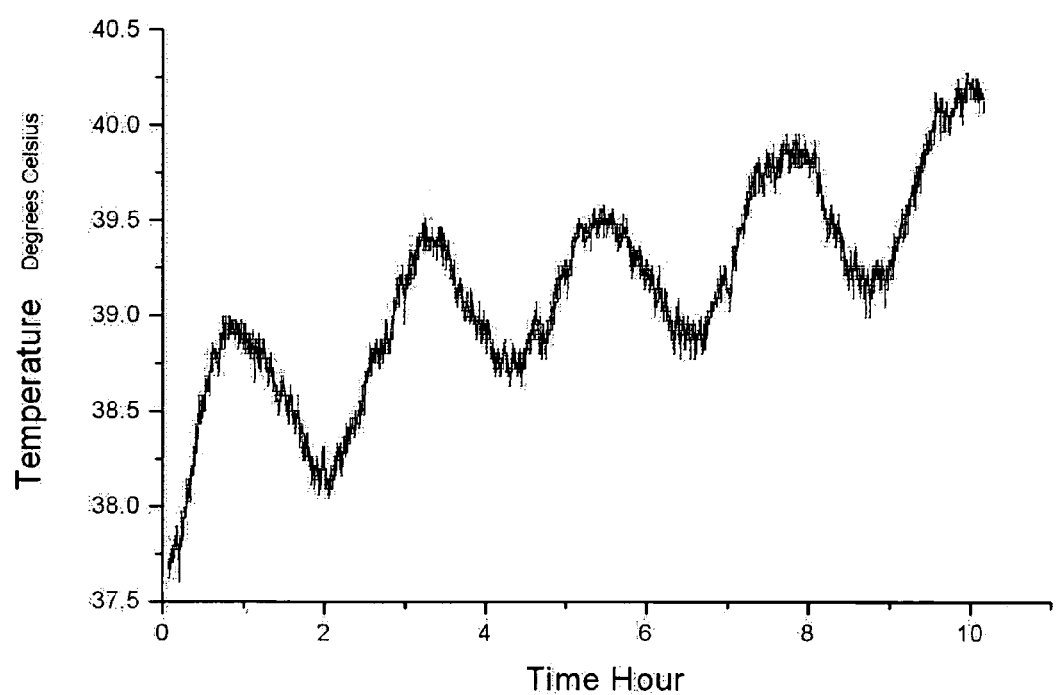
Figure 7:
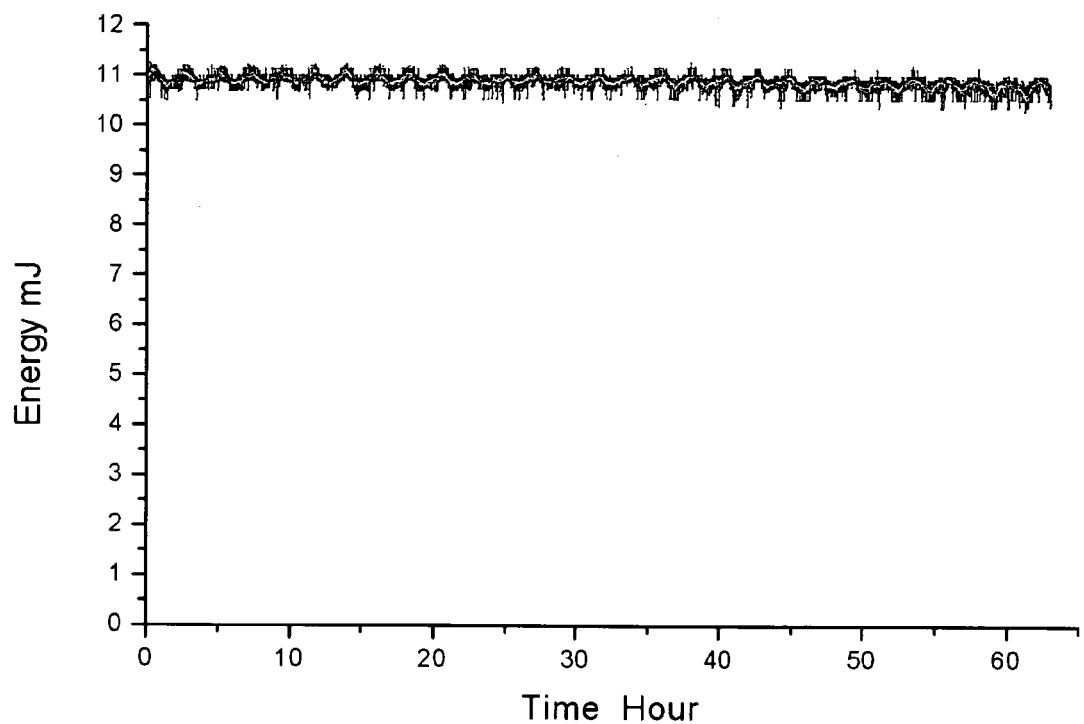

FIG. 6 shows how the temperature of the attachment to the rear mirror varied as a function of time during the time period represented as zone a as shown in FIG. 5 during which time the laser output was stabilised according to the preferred embodiment; and FIG. 7 shows the output energy of the laser at a wavelength of 1064 nm over a 60 hour period during which time the laser was actively stabilised according the preferred embodiment.

Figure 1:
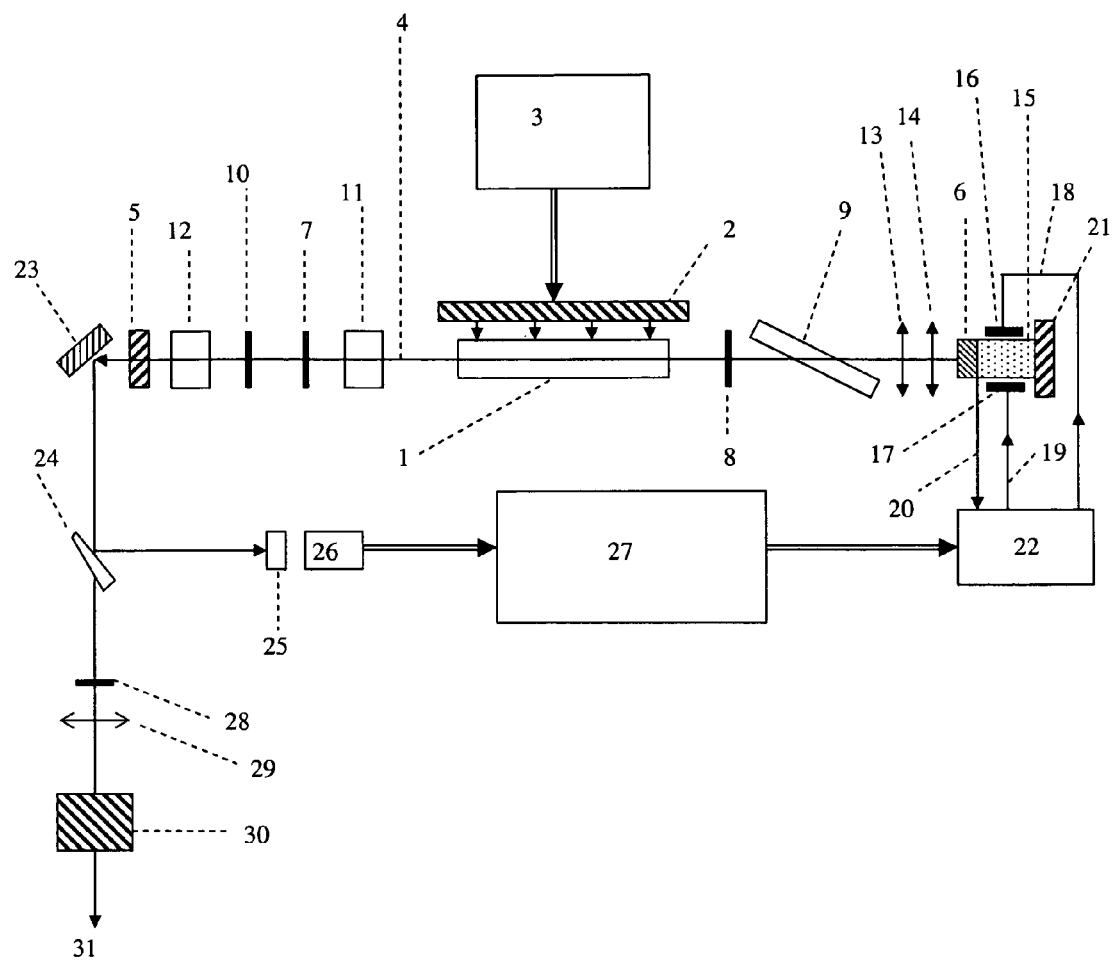
FIG. 1 shows a schematic diagram of a laser according to a preferred embodiment of the present invention.

A laser according to a preferred embodiment of the present invention will now be described with reference to FIG. 1. The laser preferably comprises a Nd:YAG crystal or rod 1 which is preferably flash lamp pumped by a Xenon flash lamp 2 driven by a power supply 3. The Nd:YAG crystal or rod 1 is preferably 4 mm diameter and 100 mm long. Ceramic reflectors are preferably provided in a close-coupled geometry. A linear laser resonator is preferably formed comprising a high reflectivity 1064 nm dielectric rear mirror 6 and an output coupler 5. The distance between the rear mirror 6 and the output coupler 5 is preferably 70 cm. The output coupler 5 preferably has a reflectivity of 20%. Spatial hole burning is preferably eliminated by using two quarter wave plates 7,8 ensuring a circular polarization within the active medium 1. A Cr:YAG (or alternatively Cr:GSGG or LiF) saturable absorber 12 having an initial transmission of 65% is prefer-ably employed as a passive Q-switch within the resonator. A single linear polarization of the output is preferably selected by a Brewster polarizer 9.

The wavelength selectivity of the cavity is preferably increased by using two Fabry-Perrot etalons 10,11. According to an embodiment a first relatively thick etalon 11 of approximately 12 GHz may be provided. A second relatively thin uncoated etalon 10 may also be provided. An optional telescope comprising lenses 13,14 may be provided in order to extend the effective cavity length and to increase the effective $TEM_{00}$ volume.

The rear cavity mirror 6 is preferably attached to a 1.5 cm long aluminum tube 15. The aluminium tube 15 preferably forms an attachment between the rear cavity mirror 6 and a rear mirror mount 21. The aluminium tube 15 is preferably attached to the rear mirror mount 21 through an insulating layer. One or more heaters 16,17 are preferably provided which may, according to one embodiment, be embedded within the aluminium tube 15. The one or more heaters 16,17 preferably act to heat and control the temperature of the aluminium tube attachment 15. The temperature of the tube 15 is preferably monitored by a thermistor sensor that preferably sends an electric current 20 to a PCB 22. The PCB 22 preferably controls the heating of the one or more heaters 16,17 through cables 18,19 in such a way that the temperature reported by the thermistor preferably remains at the given set-point temperature to an accuracy of +/−0.01 Celsius.

The laser is preferably arranged to emit 35 ns laser pulses (approx 12 mJ per pulse) at a repetition rate of preferably 28 Hz. The laser pulses preferably have a wavelength of 1064 nm and preferably are $TEM_{00}$ SLM (Single Longitudinal Mode). The output beam from the output coupler 5 is preferably reflected by a mirror 23. The output beam then preferably passes through a wedge 24. The wedge 24 preferably causes a small amount of the laser light to be reflected towards a diffuser 25 onto and a silicon photodiode 26. The detected signal from the photodiode 26 is preferably processed to determine the energy of the output laser pulse. The determined energy of the output laser pulse is then preferably transmitted to a computer 27.

The main laser pulse output at a wavelength of 1064 nm is preferably frequency converted or doubled to 532 nm. A quarter waveplate 28, a lens 29 and a KTP crystal 30 are preferably provided in order to frequency double the laser radiation from 1064 nm to 532 nm.

The laser resonator is preferably mounted on a temperature stabilized super-invar mechanical structure and is preferably enclosed in a temperature controlled environment. This helps to ensure that the physical cavity length remains as stable as possible as environmental conditions fluctuate.

Even though the laser resonator is preferably mounted on a temperature stabilised super-invar mechanical structure the output energy of the laser at 1064 nm will nonetheless drift from one longitudinal mode to another as the optical path length (or physical length) of the laser cavity varies. This mode drifting will result in poor energy stability at 1064 nm and even worse energy stability at 532 nm. At 532 nm, in the transition region between stability for one longitudinal mode and another, two modes may oscillate. This can cause mode beating and increased frequency conversion efficiency.

Figure 2:
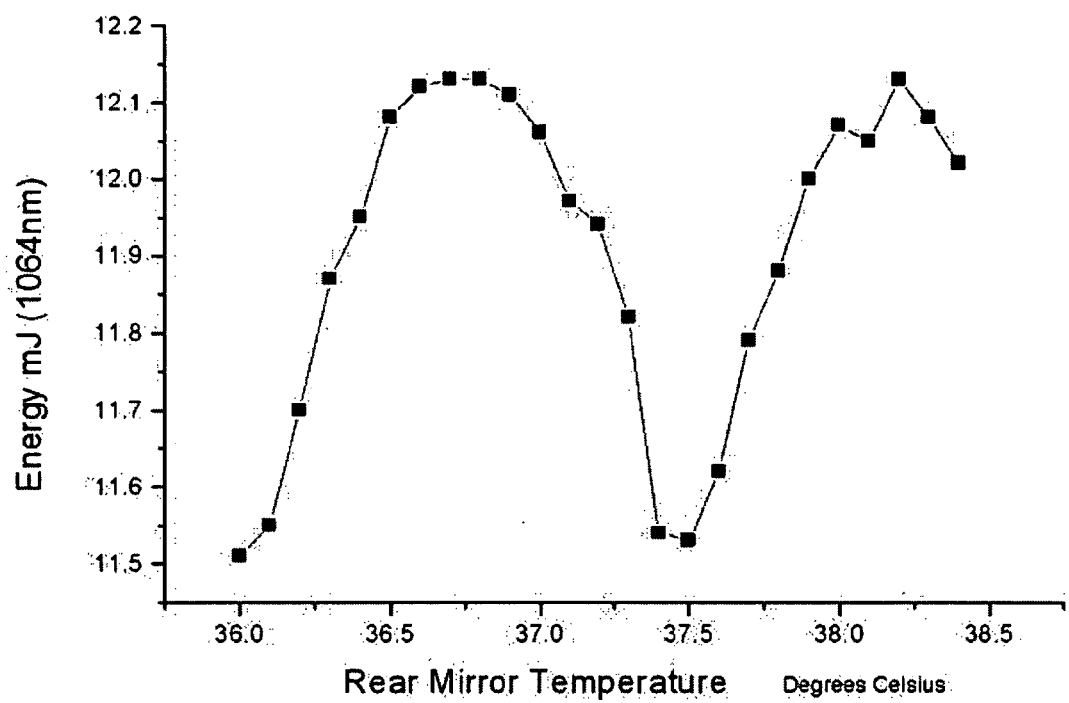
FIG. 2 shows how the laser output energy at a wavelength of 1064 nm varies as the temperature of the attachment to the rear mirror cavity increases.
Figure 3:
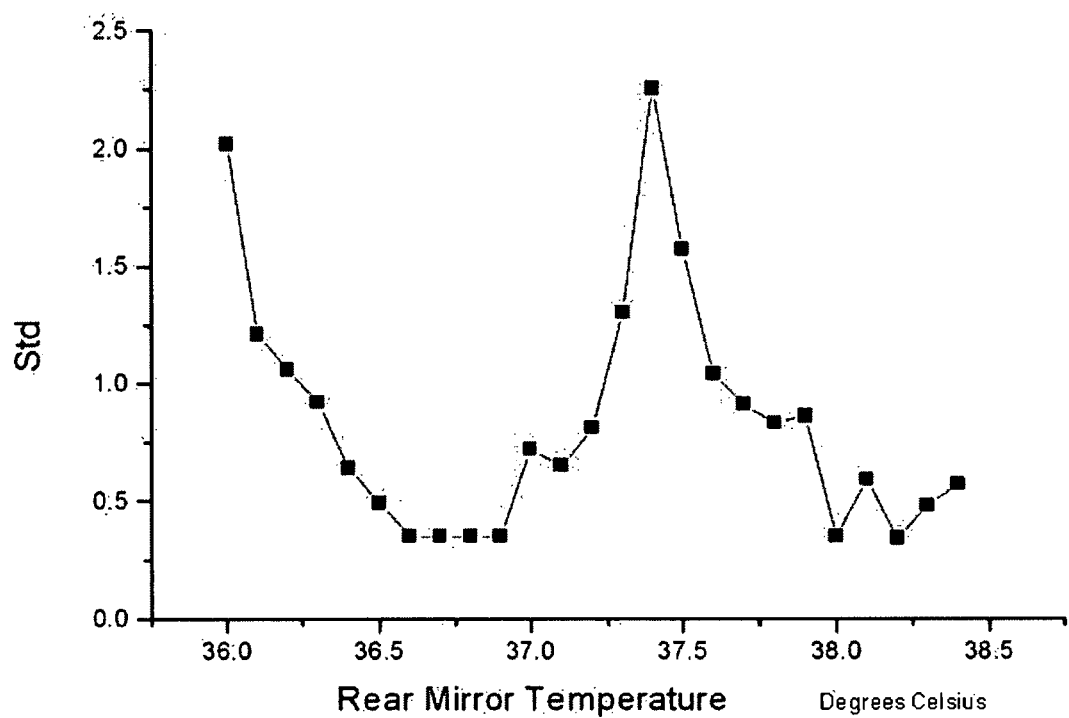
FIG. 3 shows how the standard deviation of the laser output energy for the data shown in FIG. 2 varies as the temperature of the attachment to the rear mirror increases.

FIG. 2 shows the effect of increasing the temperature of the rear mirror attachment 15. As can be seen from FIG. 2, as the temperature was increased the output energy of the laser averaged over 1000 points was seen to vary in a cyclic manner. FIG. 3 shows a graph of the standard deviation of the output energy calculated over 1000 points as a function of the temperature of the attachment 15 to the rear mirror 6.

It is apparent from FIGS. 2 and 3 that both the output energy and the standard deviation of the output energy vary cyclically with the temperature of the attachment 15 to the rear mirror 6. As the temperature of the attachment 15 to the rear mirror 6 is increased by an amount that corresponds with a thermal expansion equivalent to approximately 1 μm, then the output energy and the standard deviation of the output energy are observed to undergo a complete cycle.

High output energy and corresponding low standard deviation regions correspond to an optical cavity length that is matched to a given longitudinal mode. As the temperature and hence optical cavity length is varied away from this region then the laser increasingly begins to operate such that one particular mode is no longer optimized. When the output energy reaches a minimum and the corresponding standard deviation reaches a maximum then a zone of operation is entered wherein the longitudinal mode may change frequently from pulse to pulse.

It is apparent from FIGS. 2 and 3 that a predictable behaviour or relationship between energy output stability and the temperature of the attachment 15 to the rear mirror 6 can be discerned. According to the preferred embodiment the computer 27 preferably continually calculates and instructs the thermo-controller 22 to set the optimum temperature of the attachment 15 to the rear mirror 6 such that the averaged energy (over 1000 points) is at a maximum and hence the corresponding standard deviation (over 1000 points) of the output energy is at a minimum.

Figure 4:
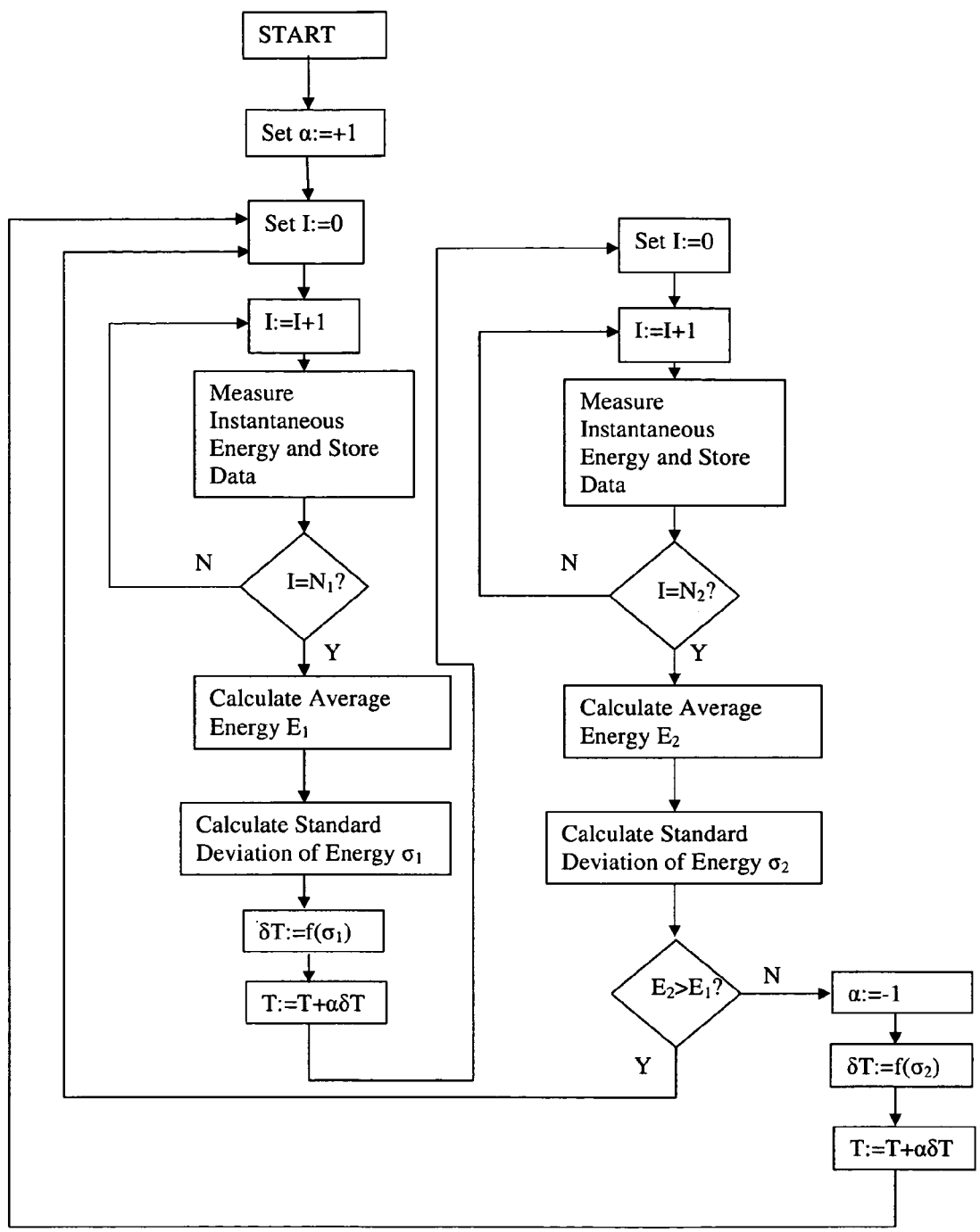
FIG. 4 shows a flow chart of the process of stabilising a laser according to an embodiment of the present invention.

FIG. 4 shows a flow chart of the preferred control process which is preferably used to iterate the temperature of the attachment 15 to the rear mirror 6. The output energy and the standard deviation of the output energy are preferably averaged over 1000 pulses. The value N1 is preferably set at 2000 pulses and the value N2 is preferably set at 1600 pulses. However, it will be apparent that N1 and N2 may be set to different values depending upon the particular laser source.

The function f as referred to in the flow chart shown in FIG. 4 is preferably chosen such that the jump in temperature is smaller as the standard deviation of the output energy gets smaller. Below a certain standard deviation (e.g. 0.5%) the function f may be set to zero. It will also be apparent to a person skilled in the art that the function f can be generally and optimally chosen according to the particular laser source being used.

The flow chart shown in FIG. 4 relates to the optimization of the averaged output energy of the laser source. However, alternative embodiments are contemplated wherein the reciprocal of the standard deviation of the output energy may be optimized.

According to another embodiment the average output energy multiplied by a coefficient and optionally added to the reciprocal of the standard deviation of the output energy multiplied by another coefficient may be optimized.

It is also contemplated that according to an embodiment a more general function of output energy and/or standard deviation of output energy may be optimised.

FIG. 5 shows a plot of the output energy at the second harmonic (532 nm) versus time over a 16 hour period. For the first 10 hours the laser was actively stabilized according to the preferred embodiment. Zone a of FIG. 5 indicates the period during which the laser was actively stabilised according to the preferred embodiment. The laser was then operated without active stabilization for a further 6 hours. Zone b of FIG. 5 indicates the period during which the laser was subsequently operated without active stabilisation according to the preferred embodiment.

FIG. 6 shows a plot of the temperature of the attachment 15 to the rear mirror 6 versus time over the 10 hour period shown in FIG. 5 during which time the laser was stabilised according to the preferred embodiment.

The laser was also operated for a 60 hour period during which time the laser was actively stabilised according to the preferred embodiment. FIG. 7 shows a plot of the output energy at a wavelength of 1064 nm versus time of a laser which was actively stabilised according to the preferred embodiment during this 60 hour period of time.

It is apparent that active stabilization of the temperature of the rear mirror attachment 15 according to the preferred embodiment enables a laser emission to be achieved which exhibits significantly improved energy and wavelength stability over a relatively long period of time. This is particularly true of emission at the second harmonic where +/−4% peak to peak energy stabilities and less than +/−1% RMS energy stabilities have been routinely obtained over a period of several days.

A laser having such excellent energy and wavelength stability is particularly useful for applications such as writing dot-matrix holographic optical elements, holographic screens and digital holograms.

The periodic oscillations in temperature which can be observed in FIGS. 5-7 and which have a period of approximately 2 hours are believed to be due to ambient temperature cycling.

The principles of actively stabilising a laser according to the preferred embodiment may also be applied to a passively or actively Q-switched nanosecond $TEM_{00}$ ring cavity high-coherence laser oscillator.

Further less preferred embodiments are contemplated wherein an intra-cavity heated glass wedge may be used instead of or in addition to a heated attachment 15 to the rear mirror 6. According to this embodiment the optical path length of the laser cavity may be changed by actively varying the temperature of the intra-cavity wedge.

Another less preferred embodiment is contemplated wherein a heated output coupler 5 may be used instead of or in addition to a heated attachment 15 to the rear mirror 6. According to this embodiment the optical path length of the laser cavity may be changed by actively varying the temperature of the output coupler 5.

Small-length linear cavity (passively or actively) Q-switched nanosecond $TEM_{00}$ lasers are intrinsically more stable than larger length counterparts. Nevertheless, a heated rear mirror attachment 15, a heated intra-cavity wedge or a heated thick output coupler can effectively improve the long term output stability.

According to another embodiment the preferred stabilisation technique may also be used to stabilise a laser oscillating at 1319 or 1338 nm wherein Nd:YAG is the active lasing medium. In addition the technique can be used effectively for lasers based on other Neodymium doped active lasing media.

According to a less preferred embodiment one or more diode lasers may be used to pump the laser instead of or in addition to a flash lamp.

Identical control algorithms may be applied for a variety of laser configurations. The control algorithm is preferably based on the fact that certain critical ranges of cavity lengths are fundamentally associated with smaller standard deviations of energy and larger average energies.

Although the present invention has been described with reference to preferred embodiments, it will be understood by those skilled in the art that various changes in form and detail may be made without departing from the scope of the invention as set forth in the accompanying claims.

The invention claimed is:

1. A pulsed laser comprising;
   a laser cavity, wherein said laser cavity comprises a cavity mirror and a metal or alloy component attached to said cavity mirror;
   one or more flash lamps arranged to pump a Neodymium doped active laser medium within the laser cavity;
   one or more heating elements arranged adjacent to or embedded within said component arranged to heat said component;
   one or more temperature sensors arranged to monitor the temperature of at least one of said component and said cavity mirror; and
   a control circuit arranged and adapted to control said heating means based on the monitored temperature in order to stabilise one or more parameters of said laser, wherein said control circuit is arranged to minimise a standard deviation of a laser output energy or maximise a reciprocal of a standard deviation of a laser output energy.

2. A laser as claimed in claim 1, wherein said component comprises a tube, block or device attached or connected directly or indirectly to said cavity mirror.

3. A laser as claimed in claim 1, wherein said one or more heating elements are arranged to cause: (i) thermal expansion of said component; and/or (ii) a reduction in the length of said laser cavity.

4. A laser as claimed in claim 1, wherein said laser further comprises a detector for detecting the output energy of said laser.

5. A laser as claimed in claim 1, wherein said parameter to be stabilised comprises: (i) the output energy of said laser; and/or (ii) the wavelength of radiation emitted or output by said laser.

6. A laser as claimed in claim 1, further comprising:
   an intra-cavity wedge; and
   intra-cavity wedge heating means arranged to heat said intra-cavity wedge.

7. A laser as claimed in claim 6, wherein said control circuit is arranged and adapted to control said intra-cavity wedge heating means in order to stabilise one or more parameters of said laser.

8. A laser as claimed in claim 1, further comprising:
   an output coupler; and
   output coupler heating means arranged to heat said output coupler.

9. A laser as claimed in claim 8, wherein said control circuit is arranged and adapted to control said output coupler heating means in order to stabilise one or more parameters of said laser.

10. A holographic printer comprising at least one, two or three pulsed lasers as claimed in claim 1.

11. A holographic copying device comprising at least one, two or three pulsed lasers as claimed in claim 1.

12. A method of stabilising one or more parameters of a laser, said method comprising:
   providing a pulsed laser comprising a laser cavity, wherein said laser cavity comprises a cavity mirror and a metal or alloy component attached to said cavity mirror;
   providing one or more flash lamps arranged to pump a Neodymium doped active laser medium within the laser cavity;
   heating said component using one or more heating elements arranged adjacent to or embedded within said component;
   monitoring the temperature of at least one of said component and said cavity mirror using one or more temperature sensors; and
   using a control circuit to control the heating of said component based on the monitored temperature in order to stabilise one or more parameters of said laser and to minimise a standard deviation of a laser output energy or maximise a reciprocal of a standard deviation of a laser output energy.

13. A pulsed laser comprising;
   a laser cavity, wherein said laser cavity comprises a cavity mirror and a metal or alloy component attached to said cavity mirror;
   one or more flash lamps arranged to pump a Neodymium doped active laser medium within the laser cavity;
   one or more heating elements arranged adjacent to or embedded within said component arranged to heat said component;
   one or more temperature sensors arranged to monitor the temperature of at least one of said component and said cavity mirror; and
   a control circuit arranged and adapted to control said heating means based on the monitored temperature in order to stabilise one or more parameters of said laser, wherein said control circuit is arranged to maximise a laser output energy or minimise a reciprocal of a laser output energy.

14. A method of stabilising one or more parameters of a laser, said method comprising:
   providing a pulsed laser comprising a laser cavity, wherein said laser cavity comprises a cavity mirror and a metal or alloy component attached to said cavity mirror;
   providing one or more flash lamps arranged to pump a Neodymium doped active laser medium within the laser cavity;
   heating said component using one or more heating elements arranged adjacent to or embedded within said component;
   monitoring the temperature of at least one of said component and said cavity mirror using one or more temperature sensors; and
   using a control circuit to control the heating of said component based on the monitored temperature in order to stabilise one or more parameters of said laser and to maximise a laser output energy or minimise a reciprocal of a laser output energy.

* * * * *